United States Patent
Muthiah

(10) Patent No.: US 11,972,148 B2
(45) Date of Patent: Apr. 30, 2024

(54) PROACTIVE STORAGE OPERATION MANAGEMENT USING THERMAL STATES

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 16 days.

(21) Appl. No.: 17/839,732

(22) Filed: Jun. 14, 2022

(65) Prior Publication Data
US 2023/0401005 A1 Dec. 14, 2023

(51) Int. Cl.
G06F 3/06 (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0604; G06F 3/0659; G06F 3/0679
See application file for complete search history.

(56) References Cited

U.S. PATENT DOCUMENTS

| | | | |
|---|---|---|---|
| 10,025,522 B2 | 7/2018 | Helmick | |
| 10,942,503 B2 | 3/2021 | Dykes | |
| 2010/0169603 A1 | 7/2010 | Perry | |
| 2011/0179222 A1* | 7/2011 | Iwasaki | G06F 3/0611 711/111 |
| 2016/0371014 A1* | 12/2016 | Roberts | G06F 3/0688 |
| 2019/0026031 A1* | 1/2019 | Kachare | G06F 3/0611 |
| 2020/0057581 A1* | 2/2020 | Choi | G06F 3/0659 |
| 2021/0294519 A1* | 9/2021 | Radhapuram | G06F 3/0604 |
| 2021/0349633 A1* | 11/2021 | Klein | G11C 16/30 |
| 2021/0405924 A1 | 12/2021 | Muthiah et al. | |
| 2023/0127204 A1* | 4/2023 | Cho | G06F 3/0634 711/154 |
| 2023/0130884 A1* | 4/2023 | Choo | G06F 3/0604 711/154 |

\* cited by examiner

*Primary Examiner* — Aracelis Ruiz
(74) *Attorney, Agent, or Firm* — Patent Law Works LLP

(57) ABSTRACT

Example storage systems, storage devices, and methods provide proactive management of storage operations using thermal states. Host storage requests are received and used to determine storage commands for a data storage device. For each storage command, a temperature index value corresponding to an estimated change in thermal state for executing the storage command may be determined. The storage commands are allocated to command queues based on the thermal index values and then executed from the command queues by the data storage device without triggering thermal throttling of storage commands.

20 Claims, 9 Drawing Sheets

PROACTIVE STORAGE OPERATION MANAGEMENT USING THERMAL STATES

TECHNICAL FIELD

The present disclosure generally relates to data storage, and in a more particular example, to proactive management of storage operations based on thermal states of the data storage devices.

BACKGROUND

Often, distributed storage systems are used to store large amounts (e.g., terabytes, petabytes, exabytes, etc.) of data, such as objects or files, in a distributed and fault-tolerant manner with a predetermined level of redundancy.

Certain storage applications require strict completion requirements. These storage applications often require edge storage devices to similarly have fast computation capabilities and to meet various speed criteria.

In some cases, various different applications may have different quality-of-service (QoS) requirements, and quite often, during peak loads, the storage devices that the applications rely upon may not be able to keep up with the latency requirements. For instance, the number of requests may exceed the capabilities of the storage devices, the high volume may cause the performance of the storage devices to slow down and/or experience failures or faults, etc. A storage device rendering a result late in time may sharply affect performance such that the storage device no longer meets its expected QoS specifications (e.g., as measured by parts per million).

In addition to total processing capacity and/or bandwidth constraints, storage devices may also be configured to operate with temperature and power constraints. In some configurations, these temperature and power constraints may define thresholds that result in throttling of all storage commands until temperature and/or power use can be returned to an acceptable operating range. A sudden change in processing capacity due to throttling from an undesired temperature or power state can severely impact QoS and disrupt any predictions of the time required by the storage device to process requests.

When the QoS of a storage device drops and causes delayed results, latency, failures, etc. (e.g., due to the device choking), the application may churn or seek other storage options. In some cases, the devices attempt to handle these scenarios and limit such issues, but these attempts have proved inadequate, particularly at scale and/or when demanding processing timelines are applicable.

A need exists for at least storage systems that are capable of mitigating the above-noted delays, latency, and/or other failures.

SUMMARY

Various aspects for proactive management of storage operations by storage systems and, more specifically using a temperature index value to arrange command queues to avoid throttling thresholds, are described.

One general aspect includes a storage system including: a processor; a memory; a non-volatile storage medium configured to store host data; a host interface configured to receive host requests from a host system; and a storage manager. The storage manager is configured to: determine a plurality of storage commands based on the received host requests; determine, for each storage command of the plurality of storage commands, a temperature index value corresponding to an estimated change in thermal state for executing that storage command; allocate, based on the temperature index values, the plurality of storage commands to at least one command queue in a queue order; and execute, from the at least one command queue, the plurality of storage commands using the non-volatile storage medium.

Implementations may include one or more of the following features. The host requests may be configured to include a cut-off time by which a result of that host request will be returned and the storage manager may be further configured to: determine an estimated processing time for each storage command; and proactively reject host requests that include at least one corresponding storage command that cannot be completed within the cut-off time. The storage manager may be further configured to: determine, based on the estimated processing time and the cut-off time, a scheduling priority for each storage command of the plurality of storage commands; and further base allocation of the plurality of storage commands to the at least one command queue on the scheduling priority for each storage command. The storage manager may be further configured to determine, for each storage command of the plurality of storage commands, an operation type; and the temperature index value may be based on the operation type. The storage manager may be further configured to determine, for each storage command of the plurality of storage commands, an operation data size; and the temperature index value may be based on the operation data size. The storage system may further include a temperature index model configured to determine temperature index values based on an operation type, an operation data size, and a current thermal state value and the storage manager may be further configured to use the temperature index model to determine the temperature index value for each storage command of the plurality of storage commands. The storage system may further include thermal state machine configured to: monitor a thermal state of a data storage device configured to process the plurality of storage commands; and throttle, responsive to a thermal throttling threshold, storage commands processed by the data storage device, where allocating the plurality of storage commands to the at least one command queue maintains the thermal state below the thermal throttling threshold. The storage manager may be further configured to determine a command arrangement policy for maintaining the thermal state below the thermal throttling threshold; allocating the plurality of storage commands to the at least one command queue may be based on the command arrangement policy; the at least one command queue may include a plurality of command queues configured for parallel execution of storage commands; and a sum of temperature index values for storage commands executed in parallel may maintain the thermal state below the thermal throttling threshold. The storage system may further include a power state machine configured to: monitor a power state of the data storage device configured to process the plurality of storage commands; and throttle, responsive to a power throttling threshold, storage commands processed by the data storage device, where allocating the plurality of storage commands to the at least one command queue increases a number of storage commands executed in parallel and maintains the power state below the power throttling threshold. The storage system may include a data storage device that includes: the processor; the memory; the non-volatile storage medium; the host interface; and the storage manager.

Another general aspect includes a computer-implemented method including: receiving, through a host interface, host requests from a host system for at least one data storage device; determining a plurality of storage commands based on the received host requests; determining, for each storage command of the plurality of storage commands, a temperature index value corresponding to an estimated change in thermal state for executing that storage command; allocating, based on the temperature index values, the plurality of storage commands to at least one command queue in a queue order; and executing, from the at least one command queue, the plurality of storage commands using the at least one data storage device.

Implementations may include one or more of the following features. The computer-implemented method may include: determining, from the host requests, a cut-off time by which a result of that host request will be returned; determining an estimated processing time for each storage command; and proactively rejecting host requests that include at least one corresponding storage command that cannot be completed within the cut-off time. The computer-implemented method may include determining, based on the estimated processing time and the cut-off time, a scheduling priority for each storage command of the plurality of storage commands, where allocating the plurality of storage commands to the at least one command queue is further based on the scheduling priority for each storage command. The computer-implemented method may include determining, for each storage command of the plurality of storage commands, an operation type, where the temperature index value is based on the operation type. The computer-implemented method may include determining, for each storage command of the plurality of storage commands, an operation data size, where the temperature index value is based on the operation data size. The computer-implemented method may include: determining reference temperature index values based on an operation type, an operation data size, and a current thermal state value; storing the reference temperature index values in a temperature index model; and using the temperature index model to determine the temperature index value for each storage command of the plurality of storage commands based on the operation type, the operation data size, and the current thermal state value for that storage command. The computer-implemented method may include: monitoring a thermal state of a data storage device configured to process the plurality of storage commands; and throttling, responsive to a thermal throttling threshold, storage commands processed by the data storage device, wherein allocating the plurality of storage commands to the at least one command queue maintains the thermal state below the thermal throttling threshold. The computer-implemented method may include determining a command arrangement policy for maintaining the thermal state below the thermal throttling threshold, where: allocating the plurality of storage commands to the at least one command queue is based on the command arrangement policy; the at least one command queue includes a plurality of command queues configured for parallel execution of storage commands; and a sum of temperature index values for storage commands executed in parallel maintains the thermal state below the thermal throttling threshold. The computer-implemented method may include: monitoring a power state of the data storage device configured to process the plurality of storage commands; and throttling, responsive to a power throttling threshold, storage commands processed by the data storage device, where allocating the plurality of storage commands to the at least one command queue increases a number of storage commands executed in parallel and maintains the power state below the power throttling threshold.

Still another general aspect includes a system including: a processor; a memory; means for storing host data; means for receiving host requests from a host system; means for determining a plurality of storage commands based on the received host requests; means for determining, for each storage command of the plurality of storage commands, a temperature index value corresponding to an estimated change in thermal state for executing that storage command; means for allocating, based on the temperature index values, the plurality of storage commands to at least one command queue in a queue order; and means for executing, from the at least one command queue, the plurality of storage commands using the means for storing host data.

The various embodiments advantageously apply the teachings of data storage devices and/or storage systems to improve the functionality of such computer systems. The various embodiments include operations to proactively manage storage commands executed by a data storage device based on a temperature index value to reduce host request throttling and request rejection. That is, the various embodiments disclosed herein include hardware and/or software with functionality to improve command queuing and rejection logic to mitigate technical problems disclosed above. Accordingly, the embodiments disclosed herein provide various improvements to data storage devices and/or storage systems.

It should be understood that the language used in the present disclosure has been principally selected for readability and instructional purposes, and not to limit the scope of the subject matter disclosed herein.

DETAILED DESCRIPTION

Figure 1:
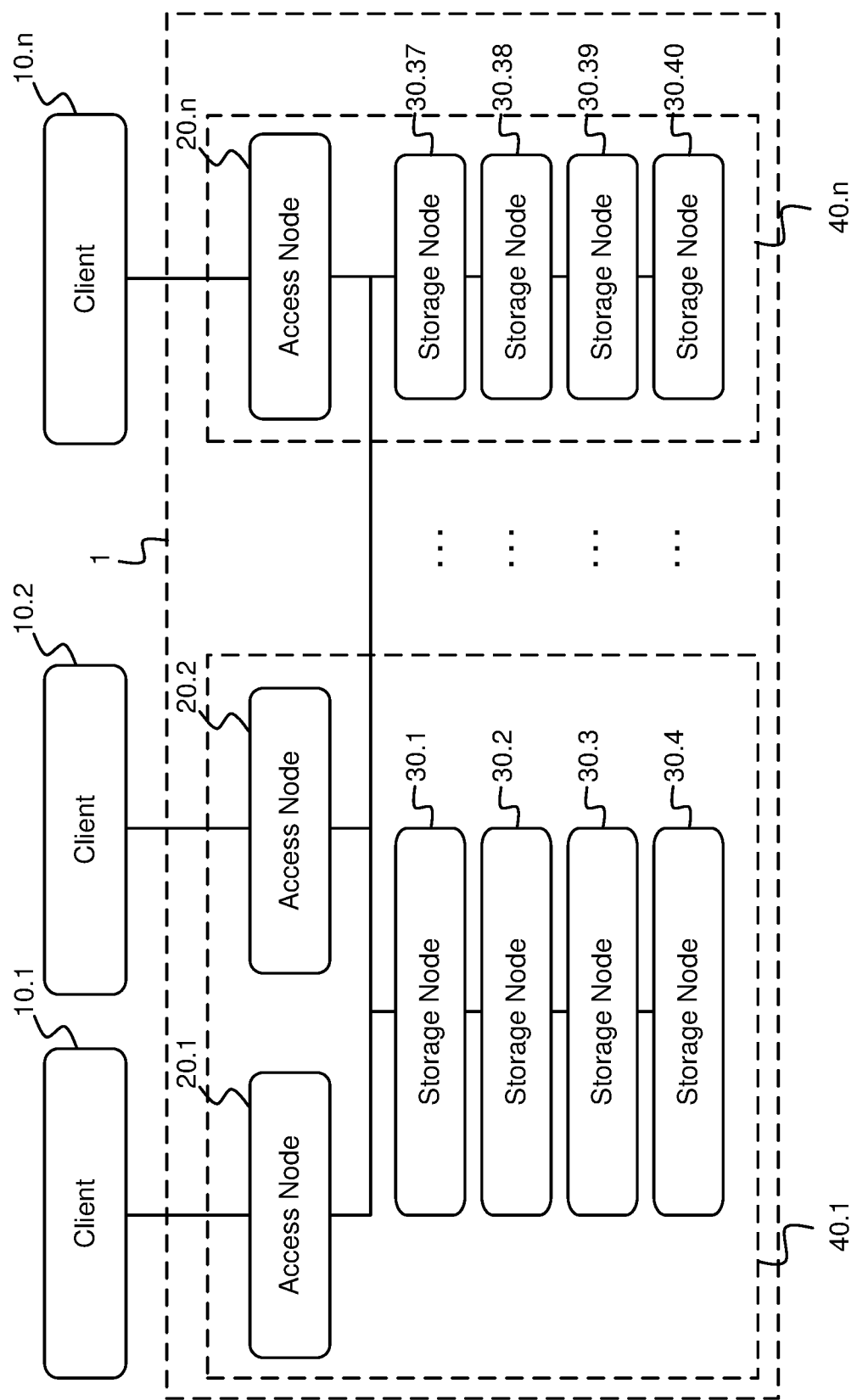
FIG. 1 schematically illustrates an example of a storage system.

FIG. 1 shows an embodiment of an example storage system 1. In some embodiments, the storage system 1 may be implemented as a distributed file, object, or other data storage system which is coupled to one or more clients 10.1-10.*n* for accessing data through one or more controller or access nodes 20.1-10.*n*.

The storage system 1 may include a plurality of controller or access nodes 20 and a plurality of storage nodes 30 which may be coupled in a suitable way for transferring data, for example by means of any suitable data communication network, such as a local area network (LAN), a wide area network (WAN), an intranet, the Internet, a cell phone network, or any combination of communication networks. Access nodes 20, storage nodes 30, and the computing devices comprising clients 10 may connect to the data communication network using any suitable wireless, optical, etc., network connections or any suitable combination of such network connections.

The access node(s) 20 may comprise a host system (also referred to as a host layer) that provides access to the storage system 1 to clients 10. For example, the host system may expose application programming interface(s) (API(s)) or any other suitable request handling interfaces that the clients 10 may interact with the access data and/or perform computing functions. The storage node(s) 30 may each comprise or include one or more storage devices that store and provide access to data and/or perform various compute functions.

Clients 10 may run or interface with one or more applications that use data stored in the storage system 1. Such an application could, for example, be a dedicated software application running on a client computing device, such as a personal computer, a laptop, a mobile phone, or any other type of communication device that can interface directly with the storage system 1.

In further embodiments, the applications could, for example, comprise a suitable file system which enables a general-purpose software application to interface with the storage system 1, an API library for the storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

Although the embodiment of FIG. 1 shows only three access nodes 20 and forty storage nodes 30, the storage system 1 could comprise any other suitable number of interconnected access nodes 20 and storage nodes 30, such as but not limited to two, four, tens, hundreds, etc., or more access nodes 20 and two or more, tens, hundreds, etc., storage nodes 30.

These access nodes 20 and storage nodes 30 may be built as general-purpose computers or may be specially configured and/or physically adapted, such as configured for arrangement in large data centers (e.g., suitably configured to be arranged in modular racks 40.1-40.n comprising standard dimensions). Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces.

An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30.

In some embodiments, HTTP/REST protocols complying with the Amazon Simple Storage Service (S3) object storage service may enable data transfer through a REST application protocol interfaces (API), although other storage protocols are also contemplated, such as network file system (NFS) protocols, small computer system interface (SCSI) protocols, fiber channel (FC) protocols, non-volatile memory (NVM) protocols, etc.

In some embodiments, access nodes 20 may operate as a highly available cluster of controller nodes with one or more integrated and/or independent interface systems, and provide for example shared access to the storage nodes 30, metadata caching, protection of metadata, etc.

In some embodiments, clients 10, access nodes 20, and/or storage nodes 30 may be interconnected using one or more network fabric protocols and related physical and logical network interface. For example, storage nodes may include non-volatile memory express (NVMe) compliant storage devices, such as solid-state drives (SSD) connected via peripheral component interconnect express (PCIe) physical interfaces. Storage nodes 30 may include NVMe interface controllers or other suitable controllers to connect to a wider network infrastructure, such as a Fibre Channel or Ethernet network that supports NVMe traffic.

As shown in FIG. 1 several storage nodes 30 can be grouped together, for example because they are housed in a single rack 40. For example, storage nodes 30.1-30.4 and 30.37-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location. They are often geographically dispersed across different data centers, for example, rack 40.1 can be located at a data center in Europe and 40.n at a data center in the USA. In further embodiments, other variations may apply where storage node 30 groups may be virtual or comprised of storage nodes 30 that are disparately located.

Figure 2:
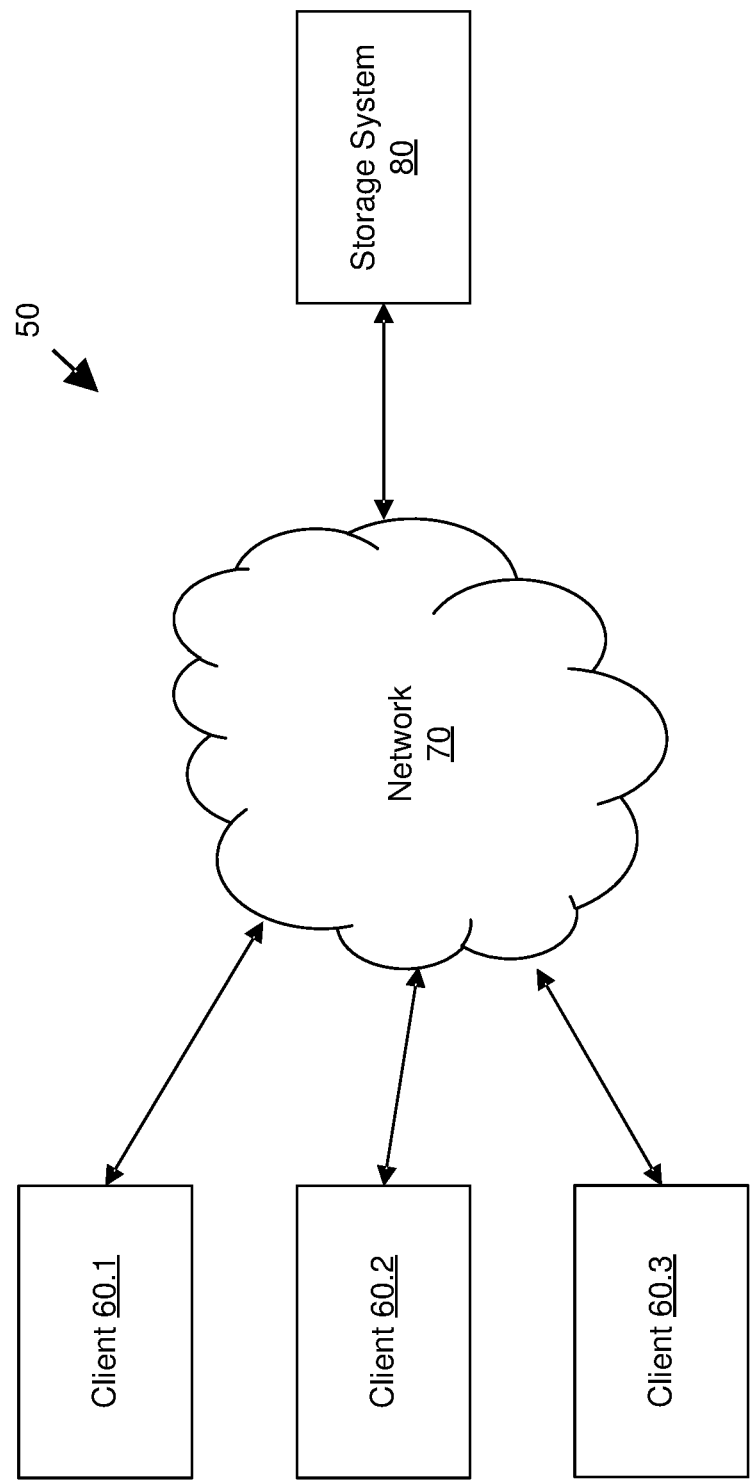
FIG. 2 schematically illustrates an example client architecture in which the storage system of FIG. 1 may operate.

FIG. 2 is a block diagram of an example storage network 50 using a client architecture. In some embodiments, storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or a hybrid thereof) capable of accessing storage system 80 utilizing network 70. Each client device 60, as part of its respective operation, relies on sending input/output (I/O) requests to the storage system 80 to write data, read data, and/or modify data. Specifically, each client device 60 can transmit I/O requests to read, write, store, communicate, propagate, and/or transport instructions, data, computer programs, software, code, routines, etc., to the storage system 80. Client device(s) 60 and storage system 80 may comprise at least a portion of a client-server model. In general, the storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as storage system 1 in FIG. 1. In some embodiments, a storage system 80 may be a local storage system that is coupled directly to a client 60 via a wired connection or a local network connection (a consumer's Wi-Fi™ network). Other variations are also applicable.

Figure 3:
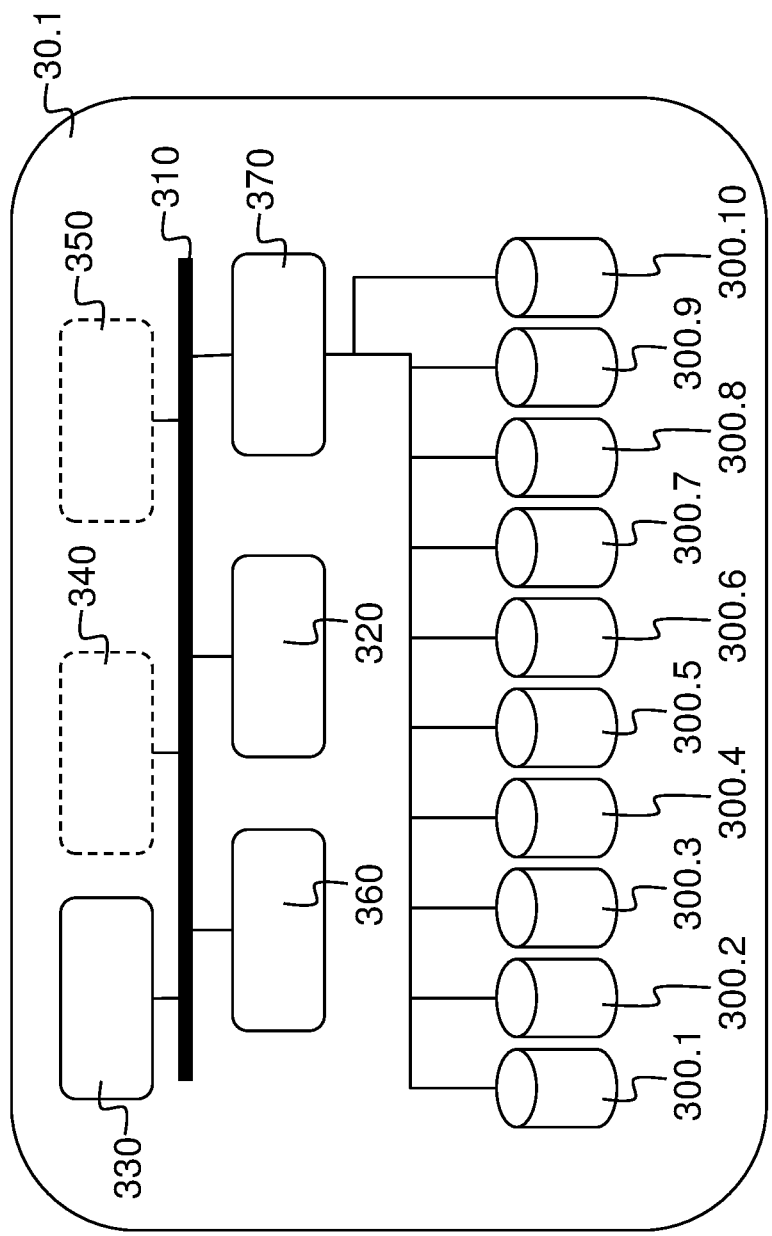
FIG. 3 schematically illustrates an example of a storage node of the storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of suitable processor or microprocessor that interprets and executes instructions. Local memory 330 may include random-access memory (RAM) or another type of dynamic storage device that stores information and instructions for execution by processor 320 and/or a read-only memory (ROM) or another type of static storage device that stores static information and instructions for use by processor 320. Input unit 340 may include one or more suitable mechanisms that permit an operator to input information to the storage node 30.1, such as a keyboard, a mouse, a pen, voice recognition and/or biometric mechanisms, etc. Output unit 350 may include one or more suitable mechanisms that output information to the operator, such as a display, a printer, a speaker, etc. Communication interface 360 may include any transceiver-like mechanism that enables storage node 30.1 to communicate with other devices and/or systems, for example, mechanisms for communicating with other storage nodes 30 or access nodes 20, such as, for example, gigabit (Gb) Ethernet interfaces.

Storage element interface 370 may comprise a storage interface, for example, a SATA interface, SCSI, a PCIe/NVMe interface, or another suitable interface, for connecting bus 310 to one or more storage elements 300, such as one or more local storage drives, for example, multi-terabyte (TB) SATA disk drives, or multi-terabyte (e.g., 2 TB) NVMe SSDs, or another suitable storage drive, and control the reading and writing of data to/from these storage elements 300. In one exemplary embodiment, as shown in FIG. 3, such a storage node 30.1 could comprise ten 6 TB SATA disk drives as storage elements 300.1-300.10 and in this way storage node 30.1 would provide a storage capacity of 60 TB to the storage system 1.

According to the exemplary embodiment of FIG. 1, and in the event that storage nodes 30.2-30.40 are identical to storage node 30.1 and each comprises a storage capacity of 60 TB, the storage system 1 would then have a total storage capacity of 2400 TB. Similarly, storage node 30.1 could comprise ten 2 TB SSDs as storage elements 300.1-300.10 and provide 20 TB to the storage system 1, resulting in a total storage capacity of 800 TB. Any suitable storage capacity is applicable. For instance, in some configurations, the storage system 1 may include a mix of storage nodes with different configurations, such as SSDs, hard disk drives (HDDs), other storage device types, etc., of varying capacities.

As is clear from FIGS. 1 and 3, the storage system 1 may comprise a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the storage system. Each of the storage nodes 30 may comprise a share of these storage elements 300.

As shown in FIG. 3, storage node 30.1 comprises ten storage elements 300.1-300.10. Other storage nodes 30 could comprise a similar amount of storage elements 300 or may have different amounts, depending on the configuration. Storage node 30.2 could, for example, comprise six storage elements 300.11-300.16, and storage node 30.3 could, for example, comprise four storage elements 300.17-300.20.

The storage elements 300 or a portion thereof may be redundant and operate independently of one another. For instance, if one particular storage element 300 fails its function it could conveniently be taken on by another storage element 300 in the storage system 1.

Figure 4:
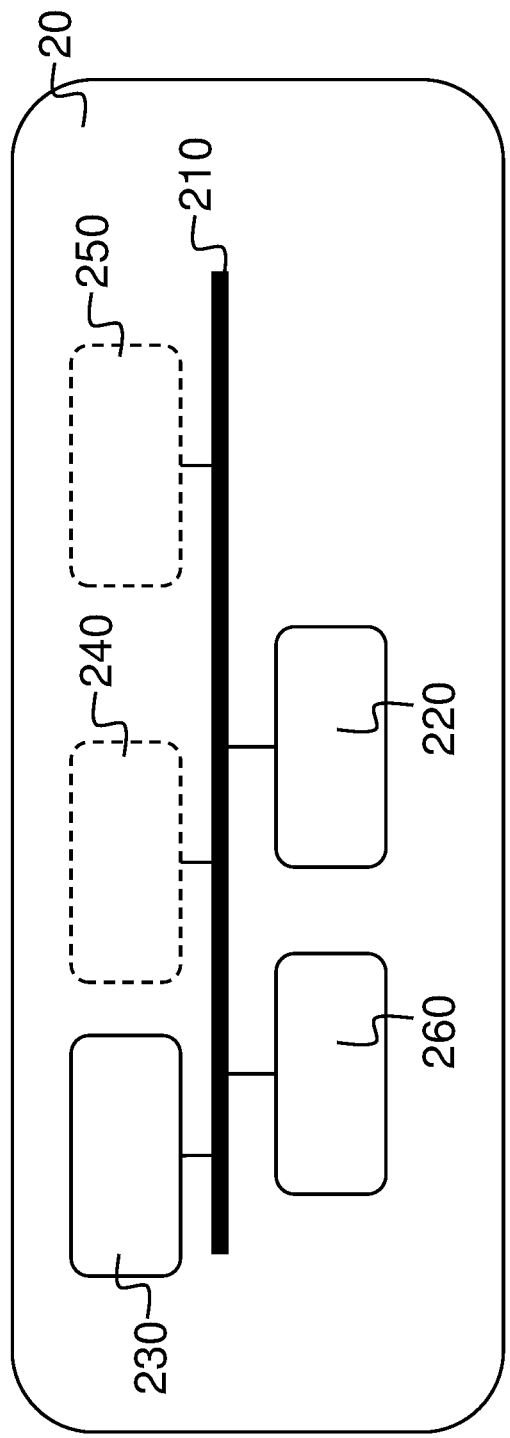
FIG. 4 schematically illustrates an example of a controller node or access node of the storage system of FIG. 1.

FIG. 4 shows a schematic representation of an embodiment of the controller or access node 20. Access node 20 may include storage controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, version control management, and/or replication engines.

Bus 210 may include one or more conductors that permit communication among the components of access node 20. Processor 220 may include any type of suitable processor or microprocessor that interprets and executes instructions. Local memory 230 may include a random access memory (RAM) or another type of dynamic storage device that stores information and instructions for execution by processor 220 and/or a read-only memory (ROM) or another type of static storage device that stores static information and instructions for use by processor 320 and/or any suitable storage elements such as a hard disk or a solid-state storage element. An optional input unit 240 may include one or more suitable mechanisms that permit an operator to input information to the access node 20 such as a keyboard, a mouse, a pen, voice recognition and/or biometric mechanisms, etc. Optional output unit 250 may include one or more suitable mechanisms that output information to the operator, such as a display, a printer, a speaker, etc. Communication interface 260 may include any transceiver-like mechanism that enables access node 20 to communicate with other devices and/or systems, for example, mechanisms for communicating with other storage nodes 30 or access nodes 20 such as, for example, Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
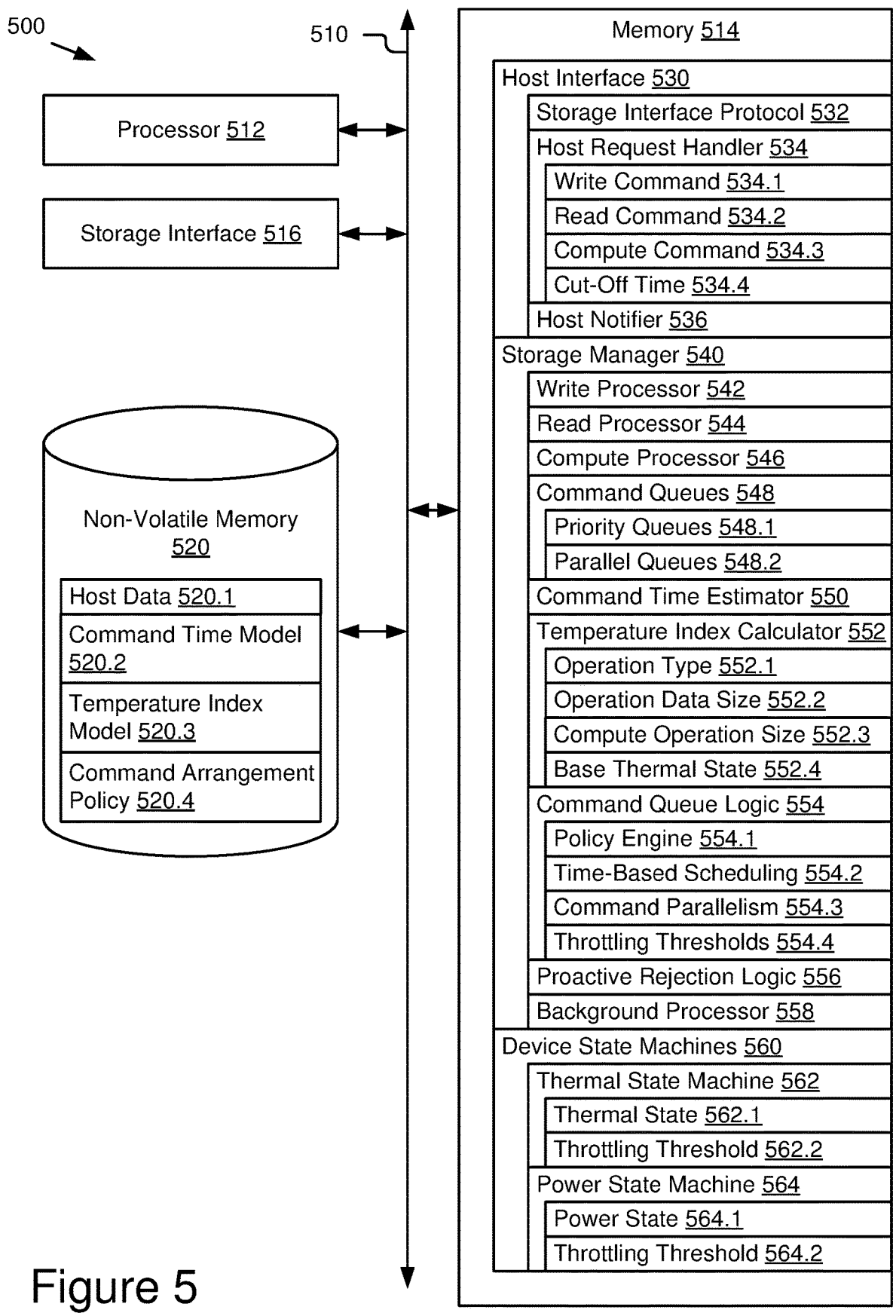
FIG. 5 schematically illustrates an example storage system.

FIG. 5 schematically shows selected modules of a storage system 500 configured for proactive management of storage commands using a temperature index value. Storage system 500 may incorporate elements and configurations similar to those shown in FIGS. 1-4. For example, the shown elements of storage system 500 may be configured as a data storage device, such as a storage element 300 in FIG. 3, and/or a combination of elements from a data storage device and a corresponding storage controller, such as storage node 30.1 in FIG. 3. In some embodiments, a storage controller may include the functions of host interface 530 and/or storage manager 540 and a data storage device may include the functions of storage manager 540 and/or device state machines 560. In some embodiments, the functions of host interface 530, storage manager 540, and device state machine 560 may be allocated between two or more storage system components, such as an access node, storage node, and storage element as described in FIGS. 1, 3, and 4.

Storage system 500 may include a bus 510 interconnecting at least one processor 512, at least one memory 514, and at least one interface, such as storage interface 516. Bus 510 may include one or more conductors that permit communication among the components of storage system 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element. In some embodiments, bus 510, processor 512, memory 514, and/or storage interface 516 may be configured as a storage device controller of a data storage device, such as an HDD or SSD.

Storage interface 516 may include a physical interface for connecting to a host using an interface protocol that supports storage device access. For example, storage interface 516 may include a PCIe, serial advanced technology attachment (SATA), serial attached small computer system interface (SCSI) (SAS), or similar storage interface connector supporting NVMe access to solid state media comprising non-volatile memory devices 520. In some embodiments, storage interface 516 may connect to or incorporate a network interface for connecting to a fabric network and the host. For example, storage interface 516 may connect to a network fabric interface through a backplane network and/or storage network interface controller supporting an NVMe-over-fabric protocol.

Storage system 500 may include one or more non-volatile memory devices 520 as a non-volatile storage medium configured to store host data. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), or triple-level cells. In some embodiments, non-volatile memory 520 may comprise a magnetic non-volatile storage medium, such as a magnetic disk or tape.

Storage system 500 may include a plurality of modules or subsystems that are stored and/or instantiated in memory 514 for execution by processor 512 as instructions or operations. For example, memory 514 may include a host interface 530 configured to receive, process, and respond to host requests from client or host systems. Memory 514 may include a storage manager 540 configured to manage read, write, and other operations to non-volatile memory devices 520. Memory 514 may include device state machines 560 configured to monitor one or more states of a data storage device, such as a data storage device embodying the shown elements of storage system 500 or a data storage device sending state information to the storage controller that controls its host interface.

Host interface 530 may include an interface protocol and/or set of functions, parameters, and/or data structures for receiving, parsing, responding to, and otherwise managing host data requests from a host. For example, host interface 530 may include functions for receiving and processing host requests for reading, writing, modifying, or otherwise manipulating data blocks and their respective client or host data and/or metadata in accordance with host communication and storage protocols. In some embodiments, host interface 530 may enable direct memory access and/or access over NVMe protocols through storage interface 516. For example, host interface 530 may include host communication protocols compatible with PCIe, SATA, SAS, and/or another bus interface that supports use of NVMe and/or remote direct memory access (RDMA) protocols for data access. In some embodiments, host interface 530 may be configured to receive host requests that include a cut-off time for determining a response window during which the response to the host request must be received by the host. For example, host requests may include a response time tag in the host request parameters that indicates a maximum or latest time that the response should be received by the requesting host.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage interface 516. For example, storage interface protocol 532 may include both PCIe and NVMe compliant communication, command, and syntax functions, procedures, and data structures. For example, host interface 530 may include a host request handler 534 configured to handle a plurality of host requests and translate them into storage and/or compute commands to be executed by a data storage device. For example, host request handler 534 may include a host notifier 536 configured to notify the host of acceptance or rejection of the host request and/or notify the host of the results of the host request, such as sending a result message or indicating a memory buffer containing the results for direct memory access. In some embodiments, host interface 530 may include additional modules (not shown) for buffer management, storage device management and reporting, and other host-side functions.

In some embodiments, each host request handled by host request handler 534 may include a distinct set of logical operations related to parsing command parameters from the host request and determining one or more storage commands for executing the host request. For example, each host request may generate one or more storage commands for storage manager 540 to process. In some embodiments, host request handler 534 may be configured to generate write commands 534.1, read commands 534.2, and/or compute commands 534.3. Host request handler 534 may be configured for receiving host data blocks and parsing related write command parameters for write commands 534.1. Host request handler 534 may be configured for parsing read command parameters, including a host logical block address (LBA) identifying one or more host data blocks, for read command 534.2. Host request handler 534 may be configured for parsing compute parameters, including compute operation types or algorithms and input and/or output data or locations, for compute commands 534.3. Host request handler 534 may determine multiple storage commands based on a host request, such as a sequential write request that generates a plurality of write commands 534.1 or a sequential read request that generates a plurality of read commands 534.2. As another example, a compute request may generate one or more read commands 534.2 for accessing target host data, compute commands 534.3 for processing or transforming the target host data, and write commands 534.1 for storing output data back to non-volatile memory 520. Write commands 534.1, read commands 534.2, and compute commands 534.3 may each parse their respective write parameters, read parameters, and/or compute parameters and pass them to storage manager 540 for allocation to command queues for processing.

In some embodiments, host requests may include a cut-off time 534.4 as a request parameter and host request handler 534 may determine cut-off time 534.4 and include it as a command parameter value for the corresponding storage commands. For example, each host request may include a cut-off or response time tag that determines the time window for executing the host request and returning any results and/or confirmation of request completion. In some embodiments, cut-off time 534.4 may be included with a host request that generates a plurality of storage commands and may be included with each resulting storage command for determining the latest time (or maximum elapsed time from receipt of the request) for completing that storage command regardless of dependencies. For example, host request handler 534 may generate a local cut-off timestamp based on adding a cut-off time value from the host request to the local receipt timestamp for the host request. A local cut-off timestamp may be included as a command parameter for write commands 534.1, read commands 534.2, and compute commands 534.3.

Host notifier 536 may be configured to provide response messages, host data blocks, and/or compute results to the requesting host in response to host requests. In some embodiments, a response message may include host data blocks and/or reference a data transfer location, such as a host or storage device storage buffer, where the host can access or receive the host data blocks and/or compute data output. In some embodiments, host notifier 536 may be configured to handle proactive rejection and/or acceptance of host requests based on the time estimates and command queue allocations of storage manager 540. For example, after passing storage commands to storage manager 540, storage manager 540 may determine whether each storage command (and corresponding host request) can be executed within cut-off time 534.4. If not, storage manager 540 may initiate host notifier 536 to send a host request rejection message to the requesting host to notify them that the data storage device is not able to meet cut-off time 534.4. If all storage commands for a host request can be handled within the applicable cut-off time 534.4, host notifier 536 may be configured to send a request acceptance or confirmation message to the requesting host or no message may be necessary depending on the configuration of the hosts (e.g., assuming no rejection means acceptance).

Storage manager 540 may include an interface protocol and/or set of functions, parameters, and data structures for reading, writing, and deleting data units in non-volatile memory devices 520. For example, storage manager 540 may include functions for executing data operations related to host storage commands received from host interface 530. For example, PUT or write commands may be configured to write host data units to non-volatile memory devices 520 through write processor 542. GET or read commands may be configured to read data from non-volatile memory devices 520 through read processor 544. Compute commands may be configured to use data storage device and/or storage controller resources to compute data functions, such as map/reduce functions, data transformations, data search/match, etc. using compute processor 546. DELETE commands may be configured to delete data from non-volatile memory devices 520, or at least mark a data location for deletion until a future garbage collection or similar operation actually deletes the data or reallocates the physical storage location to another purpose. Storage manager 540 may also include a background processor 558 for executing internal background operations, such as garbage collection, wear-leveling, media scans, etc. In some embodiments, write processor 542, read processor 544, compute processor 546, and background processor 558 may include logic paths for executing particular storage operations using processor 512, memory 514, and/or non-volatile memory 520. They may not be dedicated physical processors or circuits, but shared processor and memory resources available for each storage operation. They may also include special purpose hardware and/or software, such as read channels, write channels, specialized processing circuits (e.g., error correction, parity calculation, etc.), and other operation-specific resources. In some embodiments, storage manager 540 may include flash translation layer (FTL) management, data state machines, read/write buffer management, NVM device interface protocols, NVM device configuration/management/maintenance, and other device-side functions.

Storage manager 540 may also include interfaces, functions, parameters, and data structures for proactively managing when storage commands are executed based on queueing logic. For example, storage manager 540 may include one or more command queues 548 to receive and organize storage commands for selection and processing by write processor 542, read processor 544, and compute processor 546. In some embodiments, command queues 548 may also manage background operations for background processor 558. For example, command queues 548 may include a background queue and/or populate other queues with background operation commands as priority allows or necessity requires. In some embodiments, storage manager 540 may support proactive rejection of host requests by actively managing command queues 548 with priority scheduling and estimating completion time. For example, storage manager 540 may attempt to allocate all pending storage commands to command queues 548 in such a way that cut-off times may be met and may identify when that is not possible to support proactive rejection through host notifier 536. Storage manager 540 may be configured to use temperature index values to improve command processing efficiency while avoiding one or more throttling thresholds that would negatively impact the processing capacity of the data storage device.

In some embodiments, storage manager 540 may include a plurality of hardware and/or software modules configured to use processor 512 and memory 514 to handle or manage defined operations of storage manager 540. For example, storage manager 540 may include a write processor 542 configured to process write operations to non-volatile memory 520, a read processor 544 configured to process read operations from non-volatile memory 520, a compute processor 546 configured to process compute operations using processor 512 and other storage device resources, and a background processor 558 configured to use storage device resources for background operations. Storage manager 540 may include command queues 548 configured for organizing storage commands for execution. Storage manager 540 may include a command time estimator 550 configured to determine a processing time for each storage command and a temperature index calculator configured to determine a temperature index value for each storage command. Storage manager 540 may include command queue logic 554 for populating command queues 548 for command processing efficiency and proactive rejection logic 556 for determining those storage commands and corresponding host requests to reject to ensure results are delivered in a timely manner.

In some embodiments, command queues 548 may include a plurality of command queues for organizing storage commands and aligning them with available processor resources, such as allocation of processor cores and threads, use of read and write channels, and governing other shared command processing resources. For example, command queues 548 may include priority queues 548.1 configured to organize storage operations in a queue order based on priority values, rather than a simple first-in-first-out (FIFO) order. Priority queues 548.1 may include multiple queues assigned different priority levels, where commands are selected from the highest priority queue until it is empty, then proceed to a lower priority queue, etc. An example of this type of priority queues would include a queue for storage commands with cut-off times, a queue for storage commands without cut-off times, and a queue for background operation commands. Priority queues 548.1 may also include queues in which the queue order is determined by a priority value, such as the nearest or shortest cut-off time. In this type of queue, a shift register may allow insertion of storage commands in the queue order based on their priority as each new storage command is received. Command queues 548 may also include parallel queues 548.2 to support operations that can be executed in parallel. For example, parallel queues 548.2 may support multiple processors or threads, multiple non-volatile memory devices with distinct access channels, distinct command processors that have limited resource conflicts, and/or other configurations where storage commands may be performed concurrently, at least substantially or in part. Each command queue may have a queue order determining a sequential order of the commands in the queue, queue entry conditions determining when and where (in order) commands are added to the queue, and queue selection criteria determining when commands are removed from the queue for processing (or, in some cases, for rejection). Management and organization of command queues 548 may be determined by command queue logic 554 and proactive rejection logic 556.

Command time estimator 550 may include logic to determine how long a storage command will take to process once it is selected for execution from command queues 548. For example, command time estimator 550 may use the operation type and operation size, which may include both operation data size (the amount of data that needs to be read or written) and compute operation size (estimated amount of additional processing that needs to be done), to determine the estimated processing time required for executing the storage command. In some embodiments, command time estimator 550 may use a command time model 520.2 for determining the estimated processing time for the storage command. For example, based on experimentation, modeling, machine learning, or other characterization techniques, a plurality of storage command and/or operating parameters may be mapped to specific time values or functions for calculating time values. In some embodiments, command time model 520.2 may include a lookup table or similar data structure stored in non-volatile memory 520 that is indexed by operation type (e.g., read, write, compute) and operation size (target data size and/or estimated number of operations—which may correlate to target data size and a characterized transfer function for the operation type and/or specific compute function). Command time estimator 550 may return an estimated processing time value for each storage command and/or a sequence of storage commands with dependencies based on the corresponding host request (such as read/compute/write, sequential write, and sequential read, etc.). In some embodiments, command time estimator 550 may generate a command metadata tag or command parameter including the estimated processing time value that is added to the storage command parameters for use by other components, such as temperature index calculator 552, command queue logic 554, and proactive rejection logic 556.

Temperature index calculator 552 may include logic for determining the temperature impact of executing a storage command. For example, the processing of a storage command may represent a specific number of operations by one or more processors or circuits that generate heat as a byproduct and the estimated temperature change corresponding to those operations may be represented by a temperature index value for that storage command. In some embodiments, temperature index calculator 552 may use operation type 552.1 to determine the temperature index value. For example, write commands 534.1, read commands 534.2, and compute commands 534.3 may each have different temperature generation profiles corresponding to the heat generated by write processor 542, read processor 544, and compute processor 546. Read command may generate substantially less heat than compute commands or write commands and compute commands may generate less heat than write commands, given operations of similar operation size. In some embodiments, operation size may be based on operation data size 552.2, the amount of data to be read from or stored to non-volatile memory 520, and/or compute operation size 552.3, the number of operations needed to process the target data. For example, operation data size 552.2 may be based on the target object size. Compute operation size 552.3 may be based on average read or write operation requirements, including encoding, decoding, error correction, and other processing, and compute operations may be based on the specific compute function being used. In some embodiments, compute operation size 552.3 may be based on operation data size 552.2 and may be applied as a factor, multiplier, or other transfer function to determine an overall operation size value for the storage command.

In some embodiments, temperature index calculator 552 may use a temperature index model 520.3 to determine a temperature index value for each storage command. For example, based on experimentation, modeling, machine learning, or other characterization techniques, a plurality of storage command and/or operating parameters may be mapped to specific temperature change values or functions for calculating the thermal impact of particular storage commands. In some embodiments, temperature index model 520.3 may include a lookup table or similar data structure stored in non-volatile memory 520 that is indexed by operation type 552.1 and operation size (operation data size 552.2 and/or compute operation size 552.3). In some embodiments, temperature index model 520.3 may be further based on a current or base thermal state 552.4. For example, thermal change may be based on the present thermal saturation and rate of thermal dissipation for the data storage device and base thermal state 552.4 may impact the temperature index value. In some embodiments, temperature index model 520.3 may include reference temperature index values indexed by a combination of operation type, operation size, and thermal state, where the operation type and operation size are determined from the storage command and the thermal state is determined from thermal state machine 562. In some embodiments, a power state may also contribute to thermal impact and may be included as an additional index factor determined by power state machine 564. In some embodiments, estimated processing time from command time estimator 550 may be used in determining or as an alternate index value for operation size. Temperature index calculator 552 may return a thermal index value for each storage command and/or a sequence of storage commands with dependencies based on the corresponding host request (such as read/compute/write, sequential write, and sequential read, etc.). In some embodiments, temperature index calculator 552 may generate a command metadata tag or command parameter including the temperature index value that is added to the storage command parameters for use by other components, such as command queue logic 554 and proactive rejection logic 556.

Command queue logic 554 may include logic for determining how storage commands are added to and arranged within one or more command queues 548. For example, storage manager 540 may receive host storage commands from host interface 530 and allocate them within command queues 548 using their temperature index values and/or estimated processing time values. In some embodiments, command queue logic 554 may execute a command arrangement policy 520.4 using policy engine 554.1 for each new storage command that is received, reconfiguring the storage commands in command queues 548 to process the highest priority storage commands without triggering one or more throttling thresholds that would limit storage device performance. For example, policy engine 554.1 may use a set of logical rules for evaluating storage command temperature index values and estimated processing time values in relation to possible command arrangement, thermal and/or power states, and throttling thresholds to determine when and where new commands are inserted into command queues and whether other changes in command arrangement would support priority command processing without triggering throttling thresholds. Command arrangement policy 520.4 may be a configuration page or similar data structure that includes the set of rules to be evaluated and may be separately configured for data storage devices and groups thereof. Command arrangement policy 520.4 may define command selection priorities that determine the command types, sizes, and cut-off times that are assigned priority to maximize the number of storage commands meeting the prioritization criteria.

In some embodiments, command queue logic 554 may include time-based priority scheduling 554.2 configured to use cut-off time 534.4 and the estimated processing time for each storage command to determine priority for arranging storage commands in queue order. For example, storage commands with earlier cut-off times may be scheduled before storage commands with later cut-off times. Rules for time-based priority scheduling 554.2 may operate in conjunction with proactive rejection logic 556 to reject storage commands that cannot be completed within the cut-off time. In some embodiments, command queue logic 554 may include command parallelism 554.3 configured to determine storage commands that may be processed in parallel and arrange them in parallel command queues. For example, some storage devices may support parallel processing on different memory devices based on a number of read and/or write channels and/or compute operations may be processed in parallel with read or write operations based on multiple processor cores and/or operation threading.

In some embodiments, command queue logic 554 may include throttling thresholds 554.4 that are used as conditions for limiting the storage commands to be processed to avoid triggering data storage device throttling. For example, throttling thresholds 554.4 may include a thermal throttling threshold (e.g., thermal throttling threshold 562.2) used by the thermal state machine of the data storage device to determine when device temperature has reached a threshold temperature where processing must be throttled to allow the device to cool. Command queue logic 554 may use the thermal throttling threshold, the current thermal state of the device, and the cumulative temperature index values of storage commands in command queues 548 to predict and avoid the thermal state reaching the thermal throttling threshold. In another example, throttling thresholds 554.4 may include a power throttling threshold (e.g., power throttling threshold 564.2) used by the power state machine of the data storage device to determine when power draw has reached a threshold current that exceeds the permissible power draw for the data storage device and processing must be throttled to stay within the power configuration of the device. Command queue logic 554 may use the power throttling threshold, the current power state of the device, and concurrent operations across parallel queues to predict the total power draw and avoid the power state reaching the power throttling threshold.

Proactive rejection logic 566 may include logic for determining when one or more storage commands should be rejected because it cannot be completed within the corresponding cut-off time. For example, host requests where the processing time estimate exceeds the cut-off time may be rejected without further consideration of workload or queue arrangement. In some embodiments, proactive rejection logic 566 may operate in conjunction with command arrangement policy 520.4 and command queue logic 554 to prioritize completion of host requests within the cut-off time while also balancing thermal and power considerations to prevent throttling (which may invalidate the processing time estimates, increase the need for rejection of host requests, and/or result in failure to deliver the host results within the cut-off time). In some embodiments, proactive rejection logic 566 and/or command queue logic 554 may calculate the cumulative command processing times for each storage command and the preceding storage commands in that command queue for determining whether that storage command would complete before the cut-off time for that command (e.g., comparing the total processing time based on queue position to the cut-off time). In some embodiments, once a decision is made not to reject a storage command, command queue logic 554 will not rearrange the queues in such a way that the previously accepted command cannot be completed by its cut-off time.

For example, command arrangement policy 520.4 may positively bias read commands that may only be fulfilled by the target data storage device (where the host data is stored). Command arrangement policy 520.4 may allow read commands (including read/compute, read/modify/write, etc.) to be inserted into priority queues and/or inserted in queue positions that prioritize execution of read commands (and may cause other commands to be rejected when resources are constrained). Additionally, command arrangement policy 520.4 may favor shorter (sooner) cut-off times and position those read commands in time-based priority order to meet the shorter cut-off times. Still further, read commands may have a lower temperature index value allowing continuous and/or parallel processing while remaining below throttling thresholds.

In another example, write or compute requests with no prior association with the target data storage device may be prioritized below read commands and/or write or compute commands that do have an association (such as read/compute, continuous write with previously written data, etc.). Additionally, these write or compute commands with short cut-off times may be proactively rejected where they diminish the ability to meet other cut-off times and/or threaten the throttling thresholds. Write or compute commands with longer cut-off times may have more flexibility in how they are allocated to the command queues and may be scheduled without compromising other cut-off times or triggering throttling.

Device state machines 560 may include interfaces, functions, parameters, and data structures for monitoring one or more device states for a data storage device. For example, a data storage device may run device state machines 560 for monitoring various states and using them to govern operating modes and decisions, as well as reporting device states to other components in the storage system, such as storage controllers and/or host or client systems. In some embodiments, device state machines 560 may monitor various operational states, such as hardware failures, firmware states, processing loads or queue depths, various latency values, operating modes, background operation states, etc. The example device state machines below may directly support one or more features of host interface 530 and/or storage manager 540 described above.

In some embodiments, device state machines 560 may include a plurality of hardware and/or software modules configured to use processor 512 and memory 514 to handle or manage defined operations of device state machines 560. For example, device state machines 560 may include a thermal state machine 562 and a power state machine 564.

Thermal state machine 562 may include logic for monitoring the overall temperature state of the data storage device. For example, thermal state machine 562 may use a combination of temperature sensor inputs, component or operational thermal models, and temperature modeling to quantify a current thermal state 562.1 for the data storage device. Thermal state machine 562 may be configured to continuously, periodically, and/or on an event-basis update thermal state 562.1 based on updated input values. In some embodiments, thermal state 562.1 may use temperature values or another set of quantitative or qualitative state values to represent the thermal state of the storage device. In some embodiments, thermal state machine 562 may include a thermal throttling threshold 562.2 configured to prevent the data storage device from operating over a threshold temperature value for extended periods, which may violate storage device specifications and damage the storage device, increase error rates, and reduce both short and long-term reliability. For example, thermal throttling threshold 562.2 may be a maximum safe operating temperature for the data storage device based on device specifications and/or prior characterization. In some embodiments, thermal state machine 562 may be configured to force host interface 530 and/or storage manager 540 to throttle storage command processing in response to thermal state 562.1 meeting or exceeding thermal throttling threshold 562.2. For example, if thermal state machine 562 determines thermal state 562.1 to be greater than thermal throttling threshold 562.2, thermal state machine 562 may trigger a throttled processing mode where storage operations and/or operating power are reduced by a throttling value, such as 20% or 50%. In some configurations, multiple throttling thresholds may be used for tiered response to high temperatures and may include a critical threshold that triggers shut down or low power mode for the storage device and terminates all host storage command processing. Thermal state machine 562 may include thermal throttling threshold 562.2 as a configuration parameter available to other components in the system and may return a current thermal state 562.1 value for use by other components.

Power state machine 564 may include logic for monitoring the overall power draw and/or use of the data storage device. For example, power state machine 564 may use a combination of power metering, component or operational power models, and device power modeling to quantify a current power state 564.1 for the data storage device. Power state machine 564 may be configured to continuously, periodically, and/or on an event-basis update power state 564.1 based on updated input values. In some embodiments, power state 564.1 may use electrical current values or another set of quantitative or qualitative state values to represent the power state of the storage device. In some embodiments, power state machine 564 may include a power throttling threshold 564.2 configured to prevent the data storage device from operating over a threshold power value for extended periods, which may violate storage device specifications and damage the storage device, increase error rates, and reduce both short and long-term reliability. For example, power throttling threshold 564.2 may be a maximum normal operating power for the data storage device based on device specifications and/or prior characterization. In some embodiments, power state machine 564 may be configured to force host interface 530 and/or storage manager 540 to throttle storage command processing in response to power state 564.1 meeting or exceeding power throttling threshold 564.2. For example, if power state machine 564 determines power state 564.1 to be greater than power throttling threshold 564.2, power state machine 564 may trigger a throttled processing mode where storage operations and/or operating power are reduced by a throttling value, such as 20% or 50%. Power state machine 564 may include power throttling threshold 564.2 as a configuration parameter available to other components in the system and may return a current power state 564.1 value for use by other components.

Figure 6:
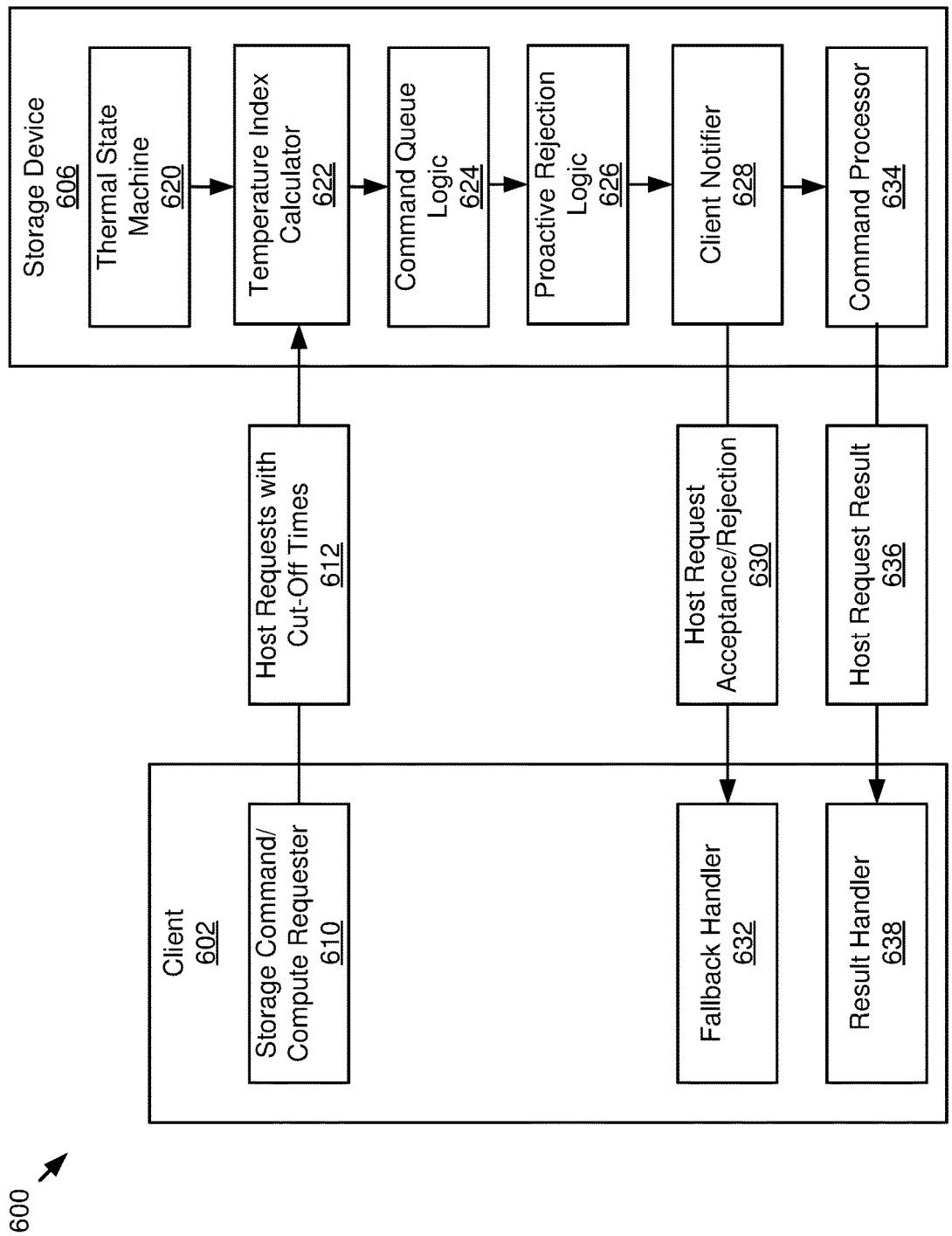
FIG. 6 schematically illustrates an example data flow between various elements of a storage system.

FIG. 6 shows an example storage system 600 configured in a client system 602 and a data storage device 606. In some embodiments, client system 602 may be configured as described above with regard to FIGS. 1-4 and storage device 606 may be configured as described above with regard to FIGS. 3 and 5. Storage system 600 may depict an example message flow and related processing components for client system 602 and storage device 606.

Client system 602 may include a storage command/compute requester configured to determine client or host requests for storage device 606. For example, client system 602 may include a data processing application and/or storage interface for storing and retrieving host data to and from storage device 606, with or without additional computational functions. Storage command/compute requester 610 may generate and send host requests including cut-off times 612 to storage device 606. For example, the applications running on client system 602 may by time and/or quality of service intensive and may require coordination among storage requests and other functions that rely on strict availability of data, computational results, and/or confirmation of data persistence according to defined time cut-offs. Storage command/compute requester 610 may include a cut-off time tag or similar request or command parameter for communicating the cut-off times for each host request and corresponding set of storage commands.

Storage device 606 may receive host requests with cut-off times 612 through a host interface, configured similarly to host interface 530 in FIG. 5, for processing or proactive rejection. Storage device 606 may include a thermal state machine 620, configured similarly to thermal state machine 562 in FIG. 5, for monitor a thermal state of the storage device. For example, thermal state machine 620 may provide a current thermal state value and thermal throttling threshold for use by other components of storage device 606. Storage device 606 may include a temperature index calculator 622, configured similarly to temperature index calculator 552 in FIG. 5, for determining a temperature index value for each storage command. For example, temperature index calculator 622 may use an operation type and operation size from the storage commands corresponding to host requests 612 and the thermal state from thermal state machine 620 to calculate the temperature index values. Temperature index calculator 622 may make the temperature index values available to other components, such as command queue logic 624, by adding a temperature index value parameter or tag to each storage command.

Storage device 606 may include command queue logic 624, configured similarly to command queue logic 554 in FIG. 5, to determine the allocation of storage commands to command queues. For example, command queue logic 624 may evaluate the cut-off time and temperature index values for the storage commands and assign them to specific command queues and positions in queue order. Command queue logic 624 may integrate with proactive rejection logic 626, configured similarly to proactive rejection logic 556 in FIG. 5, to identify storage commands that may not be completed within the cut-off time provided by client system 602. For example, command queue logic 624 may use a command configuration policy to arrange the storage commands in queues while enforcing cumulative cut-off times and maintaining cumulative temperature index values below throttling thresholds. Proactive rejection logic 626 may identify storage commands that cannot be completed within their cut-off threshold and/or shouldn't be prioritized ahead of other storage commands (to fit within their time cut-off) due to their impact on other storage commands. Proactive rejection logic 626 may pass the decision to reject or accept each command to client notifier 628. Accepted storage commands will remain in the command queues until processed by command processor 634.

Storage device 606 may include client notifier 628, configured similarly to host notifier 536 in FIG. 5, for sending rejection notifications and/or acceptance notifications to client system 602. For example, client notifier 628 may send host request acceptance/rejection message 630 to client 602. Client system 602 may include a fallback handler 632 for receiving storage command rejections and determining how client system 602 will respond. For example, fallback handler 632 may determine an alternate timeline for the storage request and resubmit it to storage device 606 with a longer cut-off time and/or determine an alternate storage device that can handle the storage request.

Storage device 606 may include command processor 634, configured similarly to write processor 542, read processor 544, and/or compute processor 546 in FIG. 5, for processing the storage command using the resources of storage device 606. For example, command processor 634 may use the processing resources and non-volatile memory of storage device 606 to execute read, write, and compute operations for completing the storage command. Storage device 606 may send a host request result message 636 to client system 602. Client system 602 may include a result handler 638 including logic for using the storage command results in the host request result message 636 to support the client application responsible for the host request.

Figure 7:
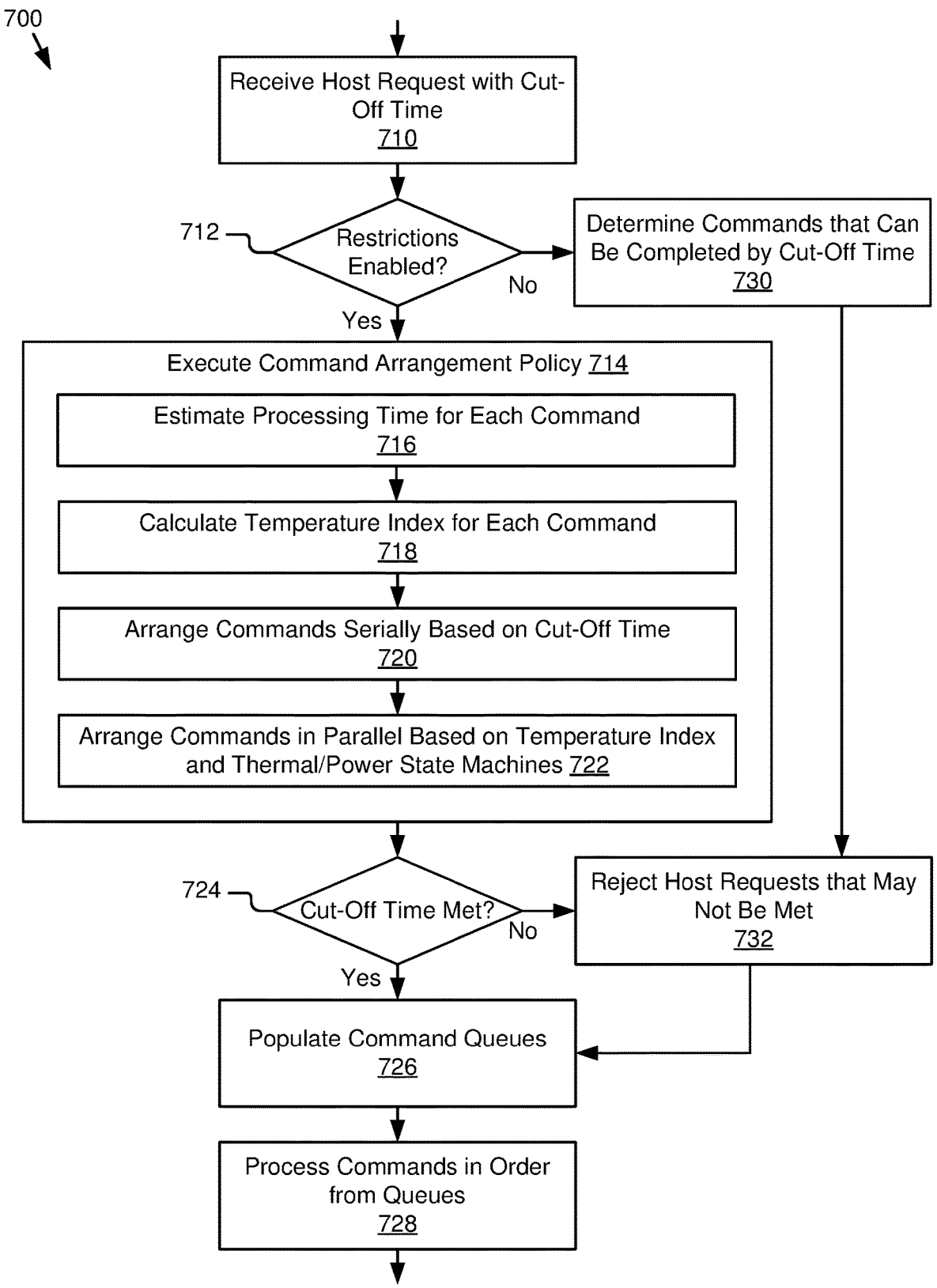
FIG. 7 is a flowchart of an example method for proactively handling storage requests using temperature index values and host cut-off times.

FIG. 7 is a flowchart of an example method 700 for proactively handling storage requests using temperature index values and host cut-off times. In some embodiments, method 700 may be executed by a storage system, such storage system 1 in FIG. 1, storage system 500 in FIG. 5, or storage system 600 in FIG. 6.

At block 710, a host request with a cut-off time may be received. For example, a host interface of a storage controller or storage device may receive a host request message that includes a cut-off time value as a request or command parameter.

At block 712, whether or not throttling restrictions in thermal and/or power state machines are enabled may be determined. For example, storage devices may be configured with thermal and/or power throttling thresholds used to determine when storage command processing should be limited to protect the storage device. If throttling restrictions are enabled, method 700 may proceed to block 714. If throttling restrictions are not enabled, method 700 may proceed to block 730.

At block 714, a command arrangement policy may be executed. For example, a storage manager may determine how storage commands corresponding to the host request are allocated to one or more command queues using a command arrangement policy. At block 716, an estimated processing time for each command may be determined. For example, the storage manager may calculate an estimated processing time based on the operation type and operation size for each storage command. At block 718, a temperature index may be calculated for each command. For example, the storage manager may calculate a temperature index value based on the operation type, operation size, and thermal state for each command. At block 720, commands may be arranged serially based on cut-off time. For example, the command arrangement policy may place storage commands with a shorter or earlier cut-off time earlier in the command queues than storage commands with longer or later cut-of times. At block 722, commands may be arranged in parallel based on temperature index and thermal and/or power state machines. For example, commands may be selected to be executed in parallel if their cumulative temperature index values do not exceed the thermal and/or power throttling thresholds.

At block 724, whether cut-off times are met may be determined. For example, based on the arrangement of commands in the command queues, the cumulative queue processing time for a storage command and its predecessors in the queue may be compared to that command's cut-off time to determine whether the cut-off time is met. If the cut-off time is met, method 700 may proceed to block 726. If the cut-off time is not met, method 700 may proceed to block 732.

At block 726, command queues may be populated. For example, based on the arrangement determined by the command arrangement policy at block 714, the storage manager may populate the command queues with the storage commands in the queue order determined.

At block 728, commands may be processed in order from the queues. For example, the storage manager may process the storage commands from the populated command queues to observe the serial priority order and parallel processing determined at block 714.

At block 730, commands that can be completed by their respective cut-off times may be determined. For example, the storage manager may compare cumulative estimated processing times to the cut-off times to determine whether the storage command is likely to be completed by the cut-off time.

At block 732, commands that may not be met may be rejected. For example, the storage manager may proactively reject storage commands with cumulative estimated processing times that exceed their cut-off times.

Figure 8:
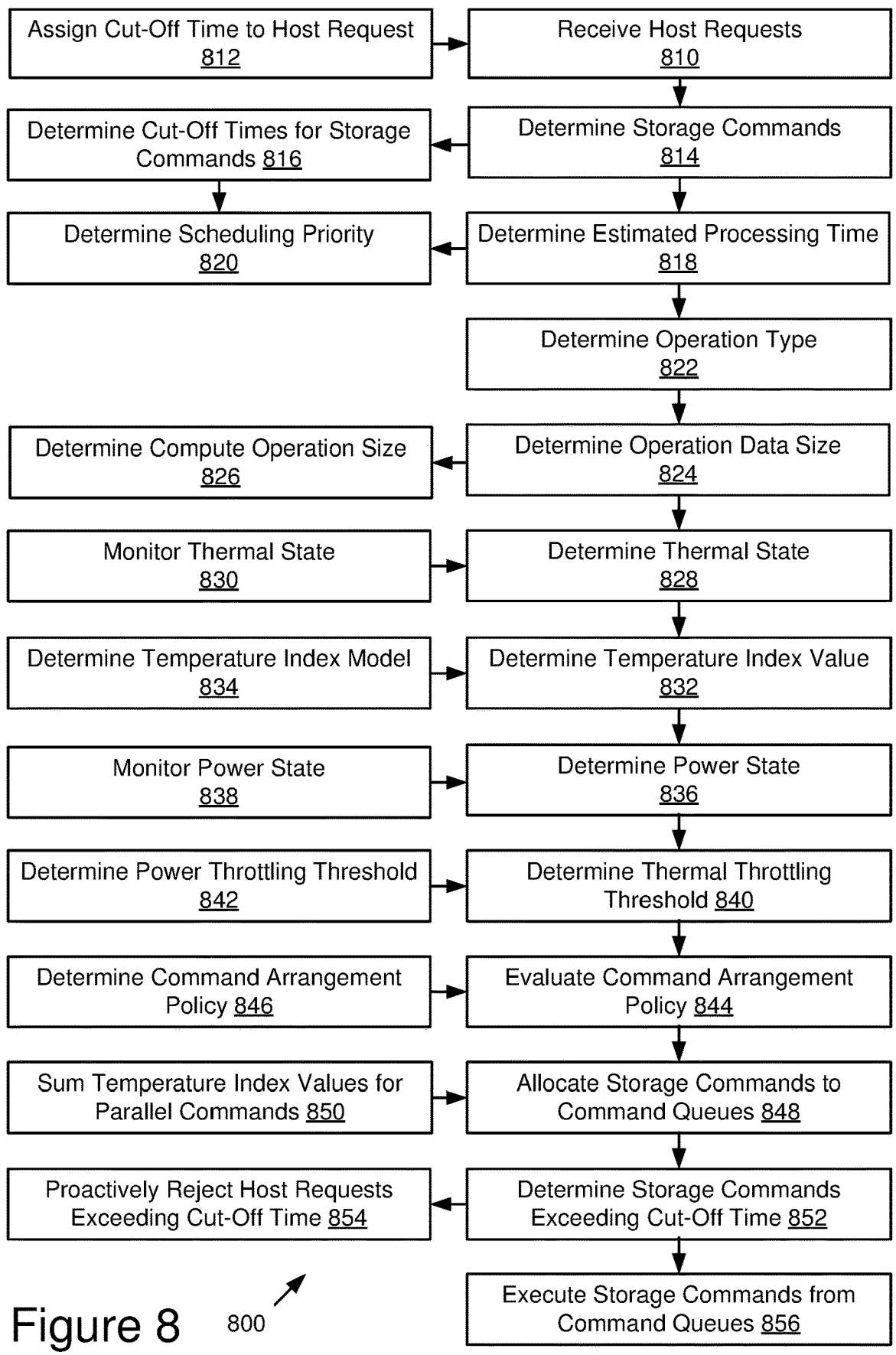
FIG. 8 is a flowchart of another example method for arranging command queues using temperature index values and host cut-off times.

As shown in FIG. 8, storage system 500 may be operated according to an example method for arranging command queues using temperature index values and host cut-off times, i.e., according to method 800 illustrated by blocks 810-856 in FIG. 8.

At block 810, host requests may be received. For example, a storage controller or data storage device may receive host requests corresponding to one or more storage commands through a host interface.

At block 812, cut-off times may be assigned to the host requests. For example, a client or host system may assign a cut-off time reflecting a necessary quality of service for that request and provide the cut-off time as a parameter of the host request.

At block 814, storage commands may be determined. For example, the host interface may parse the host requests to determine one or more corresponding storage commands.

At block 816, cut-off times may be determined for the storage commands. For example, the host interface may also parse the cut-off time parameters in each host request and include them in the command parameters of the corresponding storage commands.

At block 818, an estimated processing time may be determined. For example, a storage manager may calculate an estimated processing time for the storage command based on an estimated processing time model.

At block 820, scheduling priority may be determined. For example, the storage manager may arrange the storage commands in order of their cut-off times (lowest to highest) to place them in priority order based on when the results need to be returned.

At block 822, an operation type may be determined. For example, the storage manager may determine whether a storage command is a read, write, compute, or other operation type.

At block 824, an operation data size may be determined. For example, the storage manager may determine the object size of the data objects being targeted by the storage command.

At block 826, a compute operation size may be determined. For example, the storage manager may separately determine the volume of the data processing operations supporting the storage operation, particularly compute operations.

At block 828, a thermal state may be determined. For example, the storage manager may determine the current thermal state from a thermal state machine.

At block 830, thermal state may be monitored. For example, the thermal state machine may periodically monitor the thermal state of the data storage device that may be processing the storage command.

At block 832, a temperature index value may be determined. For example, the storage manager may calculate a temperature index value for each storage command based on a temperature index model.

At block 834, the temperature index model may be determined. For example, the storage manager may be configured with a temperature index model that is indexed using operation type, operation size, and thermal state.

At block 836, a power state may be determined. For example, the storage manager may determine the current power state from a power state machine.

At block 838, power state may be monitored. For example, the power state machine may monitor the power state of the data storage device that may be processing the storage command.

At block 840, a thermal throttling threshold may be determined. For example, the storage manager may determine the thermal throttling threshold of the thermal state machine based on configuration parameters of the thermal state machine.

At block 842, a power throttling threshold may be determined. For example, the storage manager may determine the power throttling threshold of the power state machine based on configuration parameters of the power state machine.

At block 844, a command arrangement policy may be evaluated. For example, the storage manager may include command queue logic for allocating storage commands to command queues based on a command arrangement policy.

At block 846, the command arrangement policy may be determined. For example, the storage manager may be configured with a command arrangement policy for allocating storage commands among command queues to achieve desired cut-off times without triggering throttling by the state machines.

At block 848, storage commands may be allocated to the command queues. For example, the storage manager may populate the command queues based on the configuration of storage commands determined by the command arrangement policy.

At block 850, temperature index values may be summed for parallel commands. For example, the command arrangement policy may evaluate parallel operations based on the sum of their thermal index values such that the storage commands allocated to parallel queues for parallel processing will not exceed the thermal throttling threshold as allocated in the command queues.

At block 852, storage commands exceeding the cut-off time may be determined. For example, the storage manager may determine storage commands that could not be positioned within the command queues to be processed within their cut-off time.

At block 854, host requests estimated to exceed their cut-off times may be proactively rejected. For example, the storage manager may invoke the host interface to send a host request rejection message for host requests where not all storage commands would complete in time based on the command arrangement policy.

At block 856, storage commands may be executed from the command queues. For example, the data storage device may execute the storage commands from the command queues to provide timely responses and maintain thermal and power states below the throttling thresholds in accordance with the command arrangement policy.

Figure 9:
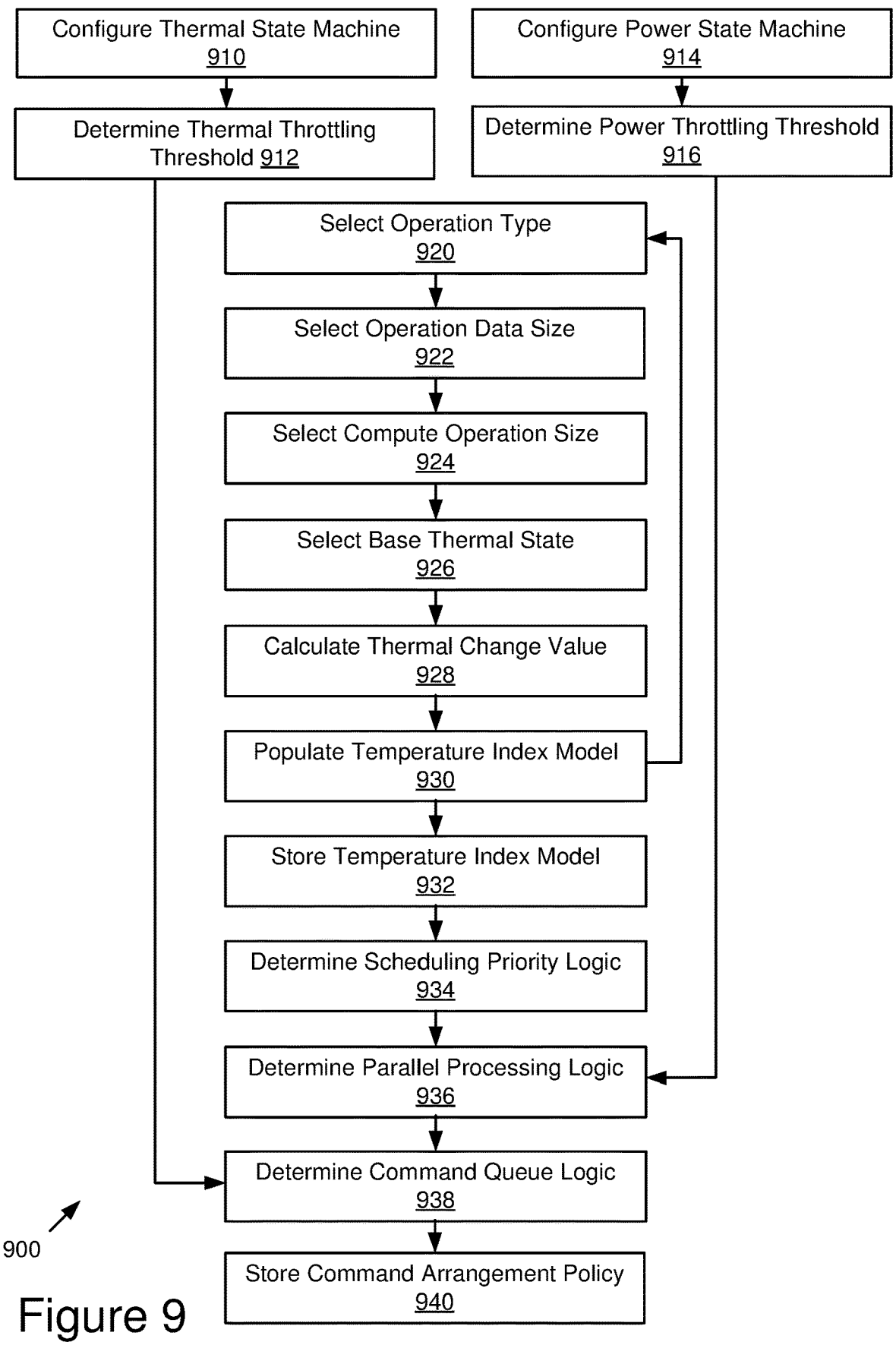
FIG. 9 is a flowchart of an example method for configuring a storage system to use temperature index values and a corresponding command arrangement policy.

As shown in FIG. 9, storage system 500 may be operated according to an example method for configuring a storage system to use temperature index values and a corresponding command arrangement policy, i.e., according to method 900 illustrated by blocks 910-940 in FIG. 9.

At block 910, a thermal state machine may be configured. For example, a storage device may include a thermal state machine that monitors the thermal state of the storage device.

At block 912, a thermal throttling threshold may be determined. For example, the thermal state machine may include one or more thermal throttling thresholds selected to reduce processing to prevent the storage device from overheating.

At block 914, a power state machine may be configured. For example, the storage device may include a power state machine that monitors the power state of the storage device.

At block 916, a power throttling threshold may be determined. For example, the power state machine may include one or more power throttling thresholds selected to reduce processing to prevent the storage device from violating its power specifications and using more power than it should.

At block 920, an operation type may be selected. For example, a plurality of operation types for a storage device may be determined, such as read operations, write operations, compute operations, and various combinations and/or subtypes thereof, and may be sequentially selected to model each type. Compute operation types (or subtypes) may include the specific compute functions supported by the data storage device.

At block 922, an operation data size may be selected. For example, a range and increment of possible data unit sizes targeted by storage commands may be determined and may be sequentially selected to model each data size.

At block 924, a compute operation size may be selected. For example, a range and increment of possible compute operation sizes may be determined and may be sequentially selected to model each operation size.

At block 926, a base thermal state may be selected. For example, a range and increment of operating temperatures for the data storage device may be determined and may be sequentially selected to model each base thermal state.

At block 928, a thermal change value may be determined. For example, based on a selected operation type, operation data size, compute operation size, and/or base thermal state, a thermal change value may be calculated using experimentation, modeling, or another characterization technique.

At block 930, a temperature index mode may be populated. For example, the thermal change value determined at block 928 may be added to the model and indexed by the corresponding selected values. This process may be repeated for each combination of the selected values across their respective types or ranges to fully populate the temperature index model.

At block 932, the temperature index model may be stored. For example, the temperature index model may be stored as a lookup table in non-volatile memory of the data storage device or storage controller.

At block 934, scheduling priority logic may be determined. For example, system administrators may define a set of logical rules for prioritizing storage commands based on their types, sizes or estimated processing times, and/or cut-off times to provide priority ordering to a set of storage commands.

At block 936, parallel processing logic may be determined. For example, system administrators may define a set of logical rules for determine whether two or more commands may be processed in parallel by a storage device based on both the necessary physical resources (processors, memory, data channels, etc.) and the cumulative power impact remaining below the power throttling threshold.

At block 938, command queue logic may be determined. For example, based on the serial priority logic determined at block 934 and the parallel processing logic determined at block 936, logical rules for mapping the storage commands to the number of command queues supported by the data storage device may be determined that enforce the cumulative temperature change, based on aggregating temperature index values, remaining below the thermal throttling threshold.

At block 940, a command arrangement policy may be stored. For example, the logical rules determined at blocks 934, 936, and 938 may be stored in a configuration page for the storage manager to evaluate for allocated storage commands to command queues.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

Various aspects of the present technology may be embodied as a system, method, apparatus, computer program product or another aspect. Accordingly, some aspects of the present technology may take the form of a hardware embodiment, a software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer-readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).f Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage system, comprising:
a processor;
a memory;
a non-volatile storage medium configured to store host data;
a host interface configured to receive host requests from a host system; and
a storage manager configured to:
   determine a plurality of storage commands based on the received host requests;
   determine, for each storage command of the plurality of storage commands, a temperature index value corresponding to an estimated change in thermal state for executing that storage command;
   allocate, based on the temperature index values, the plurality of storage commands to a plurality of command queues; and
   execute, from the plurality of command queues and in parallel, the plurality of storage commands, wherein a sum of the temperature index values for storage commands executed in parallel maintains a thermal state below a thermal throttling threshold.

2. The storage system of claim 1, wherein:
the host requests are configured to include a cut-off time by which a result of that host request will be returned; and
the storage manager is further configured to:
   determine an estimated processing time for each storage command; and
   proactively reject host requests that include at least one corresponding storage command that cannot be completed within the cut-off time.

3. The storage system of claim 2, wherein the storage manager is further configured to:
determine, based on the estimated processing time and the cut-off time, a scheduling priority for each storage command of the plurality of storage commands; and
further base allocation of the plurality of storage commands to the plurality of command queues on the scheduling priority for each storage command.

4. The storage system of claim 1, wherein:
the storage manager is further configured to determine, for each storage command of the plurality of storage commands, an operation type; and
the temperature index value is based on the operation type.

5. The storage system of claim 1, wherein:
the storage manager is further configured to determine, for each storage command of the plurality of storage commands, an operation data size; and
the temperature index value is based on the operation data size.

6. The storage system of claim 1, further comprising:
a temperature index model configured to determine temperature index values based on an operation type, an operation data size, and a current thermal state value, wherein the storage manager is further configured to use the temperature index model to determine the temperature index value for each storage command of the plurality of storage commands.

7. The storage system of claim 1, further comprising:
a thermal state machine configured to:
monitor the thermal state of a data storage device configured to process the plurality of storage commands; and
throttle, responsive to the thermal throttling threshold, storage commands processed by the data storage device.

8. The storage system of claim 7, wherein:
the storage manager is further configured to determine a command arrangement policy for maintaining the thermal state below the thermal throttling threshold; and
allocating the plurality of storage commands to the plurality of command queues is based on the command arrangement policy.

9. The storage system of claim 8, further comprising:
a power state machine configured to:
monitor a power state of the data storage device configured to process the plurality of storage commands; and
throttle, responsive to a power throttling threshold, storage commands processed by the data storage device, wherein allocating the plurality of storage commands to the plurality of command queues:
increases a number of storage commands executed in parallel; and
maintains the power state below the power throttling threshold.

10. The storage system of claim 1, further comprising:
a data storage device comprising:
the processor;
the memory;
the non-volatile storage medium;
the host interface; and
the storage manager.

11. A computer-implemented method, comprising:
receiving, through a host interface, host requests from a host system for at least one data storage device;
determining a plurality of storage commands based on the received host requests;
determining, for each storage command of the plurality of storage commands, a temperature index value corresponding to an estimated change in thermal state for executing that storage command;
allocating, based on the temperature index values, the plurality of storage commands to a plurality of command queues; and
executing, from the plurality of command queues and in parallel, the plurality of storage commands, wherein a sum of the temperature index values for storage commands executed in parallel maintains a thermal state below a thermal throttling threshold.

12. The computer-implemented method of claim 11, further comprising:
determining, from the host requests, a cut-off time by which a result of that host request will be returned;
determining an estimated processing time for each storage command; and
proactively rejecting host requests that include at least one corresponding storage command that cannot be completed within the cut-off time.

13. The computer-implemented method of claim 12, further comprising:
determining, based on the estimated processing time and the cut-off time, a scheduling priority for each storage command of the plurality of storage commands, wherein allocating the plurality of storage commands to the plurality of command queues is further based on the scheduling priority for each storage command.

14. The computer-implemented method of claim 11, further comprising:
determining, for each storage command of the plurality of storage commands, an operation type, wherein the temperature index value is based on the operation type.

15. The computer-implemented method of claim 11, further comprising:
determining, for each storage command of the plurality of storage commands, an operation data size, wherein the temperature index value is based on the operation data size.

16. The computer-implemented method of claim 11, further comprising:
determining reference temperature index values based on an operation type, an operation data size, and a current thermal state value;
storing the reference temperature index values in a temperature index model; and
using the temperature index model to determine the temperature index value for each storage command of the plurality of storage commands based on the operation type, the operation data size, and the current thermal state value for that storage command.

17. The computer-implemented method of claim 11, further comprising:
monitoring the thermal state of a data storage device configured to process the plurality of storage commands; and
throttling, responsive to the thermal throttling threshold, storage commands processed by the data storage device.

18. The computer-implemented method of claim 17, further comprising:
determining a command arrangement policy for maintaining the thermal state below the thermal throttling threshold, wherein allocating the plurality of storage commands to the plurality of command queues is based on the command arrangement policy.

19. The computer-implemented method of claim 18, further comprising:
monitoring a power state of the data storage device configured to process the plurality of storage commands; and
throttling, responsive to a power throttling threshold, storage commands processed by the data storage device, wherein allocating the plurality of storage commands to the plurality of command queues:
increases a number of storage commands executed in parallel; and
maintains the power state below the power throttling threshold.

20. A system, comprising:
a processor;
a memory;
means for storing host data;
means for receiving host requests from a host system;

means for determining a plurality of storage commands based on the received host requests;

means for determining, for each storage command of the plurality of storage commands, a temperature index value corresponding to an estimated change in thermal state for executing that storage command;

means for allocating, based on the temperature index values, the plurality of storage commands to a plurality of command queues; and means for executing, from the plurality of command queues and in parallel, the plurality of storage commands, wherein a sum of the temperature index values for storage commands executed in parallel maintains a thermal state below a thermal throttling threshold.

* * * * *